UNITED STATES PATENT OFFICE 2,409,315

FLUOROACETAMIDES AND THEIR PREPARATION

George W. Rigby and Herman E. Schroeder, Wilmington, Del., assignors to E. I. du Pont de Nemours & Company, Wilmington, Del., a corporation of Delaware No Drawing. Application April 23, 1943, Serial No. 484,302

22 Claims. (Cl. 260—561)

This invention relates to the preparation of fluorinated organic compounds and to new organic fluorine compounds. More particularly, the invention comprises a new process for the preparation of fluoroacetamides and includes new chemical products consisting of N-substituted fluoroacetamides.

It has previously been proposed to produce organic fluorine compounds by the reaction of fluorine with various organic materials. Prior investigations have shown that this reaction of fluorine is extremely energetic and generally causes pyrolysis of the organic material, resulting in the formation of carbon, tar or other undesirable carbonaceous decomposition products.

Heretofore, the only practical method for preparing fluorine containing organic compounds has been to replace chlorine or bromine with fluorine by means of various inorganic reagents, such as hydrogen fluoride, silver fluoride, antimony fluoride, mercuric fluoride and other metallic fluorides. However, such processes yield mixtures of inert products, are very restricted in application and involve considerable expense.

It is an object of this invention to provide a new process for the preparation of organic fluoroacetamides. Another object of this invention is to obtain new compositions of matter consisting of N-substituted fluoroacetamides. Still another object is to readily prepare N-substituted organic fluoroacetamides possessing many novel and useful properties. Other objects will appear hereinafter.

These objects are accomplished by reacting a polyfluoroethylene containing at least three fluorine atoms and an organic amine containing amino-hydrogen with admixture of water thereto. The admixture of water may be prior to, during or subsequent to the reaction of the polyfluoroethylene and the amine. This reaction produces N-substituted fluoroacetamides. The prefix "poly" as used herein refers to the number of fluorine atoms present in the fluoroethylene and not to polymeric materials.

New reaction products are obtained by reacting a polyfluoroethylene containing at least three fluorine atoms, such as tetrafluoroethylene, and an organic amine of the general formula $$HN\diagdown_{R'}^{R}$$

where R' is a member selected from the group consisting of alkyl, alkaryl and aralkyl and R is a member selected from the group consisting of hydrogen, alkyl, aryl, alkaryl and aralkyl and admixing water therewith. These new reaction products are N-substituted fluoroacetamides.

A preferred form of the invention may be carried out by reacting tetrafluoroethylene with an organic amine containing amino-hydrogen in the presence of water and a mild base.

The polyfluoroethylenes suitable for use in this invention may be represented by the general formula $CX_2=CX_2$ where one X is selected from the group consisting of hydrogen and halogen and the other three X's are fluorine. Thus the formula may be written $CFX=CF_2$ where X is selected from the group consisting of hydrogen and halogen. In the case of the trifluoroethylenes, two products may be obtained depending upon the conditions and the course of the reaction. They are illustrated by the following equations:

$$CFX=CF_2+RNH_2+H_2O \longrightarrow HCFX-\overset{O}{\overset{\|}{C}}-NHR+2HF$$

$$CF_2=CFX+RNH_2+H_2O \longrightarrow HCF_2-\overset{O}{\overset{\|}{C}}-NHR+HF+HX$$

It cannot always be predicted accurately beforehand which amide will be obtained from a particular trifluoroethylene and amine. In certain instances, a mixture of amides is obtained which may be separated by fractional distillation.

The organic amines suitable for use in this invention may be any organic amine containing amino-hydrogen. The term "organic amine containing amino-hydrogen" designates a primary or secondary amine which may be saturated or unsaturated, aliphatic or aromatic, cyclic or heterocyclic, monoamine or polyamine.

The N-substituted fluoroacetamides prepared in accordance with this invention may be represented by the general formula $$HCFX\overset{O}{\overset{\|}{C}}-N\diagdown_{R'}^{R}$$

where X is selected from the group consisting of hydrogen and halogen and $$-N\diagdown_{R'}^{R}$$

is an organic radical corresponding to the particular primary or secondary amine employed in the reaction. In the new products produced by this invention, X may be hydrogen or halogen, but is preferably fluorine, R' is a member selected from the group consisting of alkyl, alkaryl and aralkyl and R is a member selected from the group consisting of hydrogen, alkyl, aryl, alkaryl and aralkyl. It is to be understood that the term "alkyl" includes cyclic as well as acyclic radicals.

In order to obtain the amides of the present invention, it is desirable that a small amount of water be present in the reaction mixture so that the reaction is carried out under hydrous conditions. Sufficient water may be contained in the reagents as an impurity or as water of crystallization, such as from the borax in the examples. Although, in the preferred embodiments of this invention it is desirable to have present in the reaction mixture the amount of water required for the reaction (either as water of crystallization, as an impurity in the reactants or added as such) it is not essential for this reaction that any or all of the water required be present initially since the same results can be obtained by watching the reaction product with an aqueous alkaline solution as is illustrated in Example VI wherein none of the water required was added to the reactants and in Examples I and II wherein only a portion of the water required for the yield of product obtained was present initially. The proportion of water may vary within relatively wide limits depending largely upon the nature of the reactants, but the amount of water should not be such as to cause appreciable hydrolysis of the product. In general, the molar ratio of water (present either as an impurity, as water of crystallization or added as such) to polyfluoroethylene is in the range of 0.1 to 2 and preferably in the range of .1 to 1. One reason why such small amounts of water are applicable is that in case a basic inorganic salt is used to neutralize the hydrogen halides water is formed and is thus available for further reaction.

The method for carrying out the reactions varies to some extent with the different amines, but the usual procedure consists in charging a given amount, preferably an excess, of a primary or secondary amine and a polyfluoroethylene containing at least three fluorine atoms, such as tetrafluoroethylene, with a small amount of water and mild base into a high-pressure reaction vessel and heating for several hours. It is desirable to limit the amount of water in order not to decompose or hydrolyze the N-substituted fluoroacetamides.

The temperature at which the reaction is effected may be varied over a wide range, depending largely upon the nature of the reactants, the catalyst, the results desired and other conditions of the reaction. Although it is desirable to carry out the reactions at an elevated temperature, the temperature should be below that at which decomposition of either the reactants or products occur. In general, considerable reaction is obtained at 35° C. or lower temperature, but usually it is desirable to heat the reaction mixture to 50° C. or higher in order to obtain an appreciable reaction in a reasonable time. The preferred temperature range is 50°–200° C., but temperatures as high as 250° C. are sometimes desirable.

The invention is further illustrated by the following examples in which the parts are by weight unless otherwise specified:

Example I

A mixture of 80 parts of diethyl ether, 10 parts of borax and 73 parts of freshly distilled mono-n-butylamine was charged into a stainless steel autoclave which was swept out with nitrogen, and then 50 parts of tetrafluoroethylene was added. The autoclave was closed and heated at 100° C. for 8 hours with agitation. At the end of this time practically no pressure remained in the autoclave. The product was removed from the autoclave with ether, washed with saturated aqueous potassium carbonate solution, dried and rectified. The distillate consisted of 44.7 parts of recovered n-butylamine together with 67.5 parts of N-n-butyl difluoroacetamide boiling at 113° C./30 mm. leaving 4.8 parts of residue. The yield of amide corresponds to 90% of the theoretical based on the tetrafluoroethylene. The amide had the following properties and composition: $n_D^{25}$, 1.4112; $d_4^{25}$, 1.1029; F, 24.49%; N, 9.44%.

Example II

A high-pressure reaction vessel was charged with 65 parts of di-n-butylamine, 10 parts of borax and 50 parts of tetrafluoroethylene and heated at 75° C. for 8 hours. At the end of this time the pressure in the vessel was negligible. The product was removed and worked up as described in Example I. There was obtained 8.5 parts of unreacted di-n-butylamine and 63.8 parts of N-di-n-butyl difluoroacetamide boiling at 107° C. at 10 mm.; $n_D^{25}$, 1.4270, $d_4^{25}$, 1.0158; F, 18.52%; N, 6.71%.

Example III

A mixture of 108 parts of monomethylaniline, 15 parts of borax and 50 parts of tetrafluoroethylene was charged into a stainless steel autoclave and the mixture heated with shaking at 150° C. for 24 hours. Some pressure remained in the autoclave indicating incomplete reaction. The contents of the autoclave were removed with ether and rectified to yield 67 parts of unreacted monomethylaniline and 47.4 parts of N-methyl difluoroacetanilide, boiling at 94° C. at 1.5 mm.; $n_D^{25}$, 1.5036; $d_4^{25}$, 1.2305; F, 20.87%; N, 8.23%.

Example IV

A stainless steel autoclave was flushed with nitrogen and charged with 80 parts of anhydrous diethyl ether, 10 parts of borax and 73 parts of n-butylamine. Then the autoclave was closed, cooled in Dry Ice, evacuated and charged with 58 parts of chlorotrifluoroethylene. The mixture was heated at 100° C. with shaking for 8 hours and on opening the autoclave, there was no evidence of any unreacted chlorotrifluoroethylene. The mixture was filtered and the filtrate was rectified through an efficient column. Twenty-five parts of fraction (I) boiling at 97°–120° C./10–12 mm. and about 17 parts of fraction (II) boiling at 89.5°–90.7° C./0.5 mm. were obtained. The rectification was interrupted after obtaining fraction (I) in order to remove a considerable amount of solid which had separated in the still pot during the distillation. The solid was readily removed by washing the mixture with water. Fraction (I) was purified by redistillation, boiling point 98°/13 mm.; $n_D^{25}$, 1.4110; $d_4^{25}$, 1.1050; F, 25.42%; N, 9.95%; molecular weight 148 and 152. The analytical data and physical constants indicate fraction (I) is N-n-butyl difluoroacetamide. Fraction (II) was found to have the following physical properties: $n_D^{25}$, 1.4431; $d_4^{25}$, 1.1376; C, 43.00%; H, 6.71%; Cl, 18.18%; F, 11.83%; N, 9.48%; molecular weight 171 and 162 which indicates the material is N-n-butyl chlorofluoroacetamide.

Example V

A mixture of 80 parts of diethyl ether, 10 parts of borax, 58 parts of hexamethylenediamine and 50 parts of tetrafluoroethylene was heated in a stainless steel autoclave at 50° C. for 8 hours. After removing the unreacted diamine by distillation, the di-difluoroacetamide of hexamethylenediamine was recrystallized from benzene. F, 29.37%.

Example VI

A mixture of 20 parts of n-octylamine and 25 parts of tetrafluoroethylene was heated 4 hours at 100° C. The product was removed with ether, washed with a dilute aqueous sodium bicarbonate solution, dried and rectified. There was obtained 9.3 parts of N-n-octyl difluoroacetamide boiling at 115° C./5 mm.; $n_D^{25}$, 1.4300; F, 16.9%.

Among the polyfluoroethylenes containing at least three fluorine atoms which are applicable in this invention are trifluorobromoethylene, trifluoroethylene, trifluorochloroethylene, tetrafluoroethylene and trifluoroiodoethylene. The tetrahaloethylenes react more readily than trifluoroethylene, and tetrafluoroethylene is particularly preferred, as it reacts the most readily.

The preferred amines for use in this invention are alkylamines. However, the invention is applicable to any organic amine containing amino-hydrogen including alkyl, dialkyl, methyl, dimethyl, ethyl, diethyl, methyl ethyl, propyl, dipropyl, methyl propyl, methyl butyl, amyl, diamyl, hexyl, dihexyl, octadecyl, cyclopentyl, cyclohexyl, allyl and methallyl amines, ethylenediamine, 1,2-propylenediamine, 1,3-butylenediamine, tetramethylenediamine, pentamethylenediamine, octamethylenediamine, decamethylenediamine, and their mono-N-alkylated derivatives, N,N'-dimethyl hexamethylenediamine, aromatic amines such as toluidines, N-methyl toluidine, benzyl amines, monoethyl aniline, naphthylamine, N-methyl naphthylamine, amino acids and esters.

A mixture of amines may be employed in the present invention. It is usually desirable to use a molar excess of amine rather than of the expensive polyfluoroethylene, and the excess amine may also exhibit a catalytic effect. Sometimes it is desirable to employ an organic solvent, such as ethers, diethyl ether, dioxane and benzene.

It is usually desirable to use a mild alkaline reagent to remove the hydrogen halides, but such a basic catalyst is not always necessary as is illustrated in Example VI. However, when a mild alkaline reagent is not used it is desirable to add a larger excess of the amine. A wide variety of catalysts are operable including borax, disodium phosphate, various sodium and potassium salts such as carbonate, bicarbonate, acetate, cyanide and hydroxide, various organic amines, such as tertiary amines, and an excess of the particular amine employed may help in removing the hydrogen halides. Special significance is attached to the use of borax which contains water of crystallization and is very convenient in the present process.

The proportion of catalyst may vary within relatively wide limits depending largely upon the nature of the reactants, although efficient reaction may be effected without the use of catalysts. Generally speaking very desirable results may be obtained with the use of an amount of catalyst corresponding to about .01 to 20.0% by weight of the materials used. Advantageous results are sometimes obtained by using a combination of catalysts.

It will be understood that the operating conditions may vary widely depending upon the nature of the reactants and also upon the results desired. The time required for carrying out the reactions may vary from a few minutes to several days depending upon the nature of the reactants and the other operating conditions, such as temperature, pressure and catalyst.

The reaction may be carried out in a closed system, or the reaction may be carried out in the vapor phase by mixing the vapors of the organic amine containing amino-hydrogen and the polyfluoroethylene such as tetrafluoroethylene, with a small amount of water and passing the mixture through a hot reaction tube which if desired may contain a catalyst. In general the reaction is carried out under subatmospheric, atmospheric or superatmospheric pressure in the range of .1 to 350 atmospheres. The preferred pressure range is 1 to 200 atmospheres.

The reactions may be carried out in any suitable reaction vessel which is capable of withstanding heat and pressure, such as stainless steel, iron, silver and aluminum. The reaction is preferably carried out with agitation, although agitation is not always necessary. The reaction and the separation or isolation of the products may be carried out simultaneously or in separate steps. The products may be separated by filtration, extraction, or distillation, depending upon the nature of the products.

The present invention is useful for the production of a wide variety of N-substituted fluoroacetamides.

The reaction of ammonia with polyfluoroethylenes, e. g., tetrafluoroethylene differs from the reaction of tetrafluoroethylene with primary and secondary amines in that difluoroacetamide is not obtained. When ammonia is reacted with tetrafluoroethylene under anhydrous conditions, high yields of a product, boiling at 73° C./9 mm. are obtained. Analyses, physical constants and molecular weight indicate that the product has an empirical formula corresponding to $C_6H_3F_6N_3$, presumably a trimer of difluoroacetonitrile.

The products of this invention are useful for various commercial purposes, such as in pharmaceuticals, plasticizers, and bactericides. The N-substituted fluoroacetamides may also be hydrolyzed to yield fluoroacetic acids which may be useful as intermediates for preparing other compounds.

The invention is particularly advantageous in that it offers a safe, flexible, practical and economical method of producing fluorinated products of the character herein described. One of the advantages of the invention is that the process may be operated with none or a relatively small amount of catalyst and the reaction proceeds smoothly and easily without undesirable side reactions. Furthermore, the use of small amounts of catalyst reduces the time, temperature and cost of operation.

As many apparently widely different embodiments of this invention may be made without departing from the spirit and scope thereof, it is to be understood that we do not limit ourselves to the specific embodiments thereof except as defined in the appended claims.

We claim:

1. A process for the production of fluoroacetamides which comprises reacting a polyfluoroethylene containing at least three fluorine atoms 1. and an organic amine containing amino-hydrogen with admixture of water thereto.
2. A process for the production of fluoroacetamides which comprises reacting, in the presence of water, a polyfluoroethylene containing at least three fluorine atoms and an organic amine containing amino-hydrogen.
3. A process for the production of fluoroacetamides which comprises reacting, in the presence of water and a basic catalyst, a polyfluoroethylene containing at least three fluorine atoms and an organic amine containing amino-hydrogen.
4. A process for the production of fluoroacetamides which comprises reacting at an elevated temperature and under pressure, a polyfluoroethylene containing at least three fluorine atoms and an organic amine containing amino-hydrogen with admixture of water thereto.
5. A process for the production of fluoroacetamides which comprises reacting, in the presence of borax, a polyfluoroethylene containing at least three fluorine atoms and an organic amine containing amino-hydrogen.
6. A process for the production of fluoroacetamides which comprises reacting, under hydrous conditions, a polyfluoroethylene containing at least three fluorine atoms and an organic amine containing amino-hydrogen.
7. A process for the production of fluoroacetamides which comprises reacting tetrafluoroethylene and an organic amine containing amino-hydrogen with admixture of water thereto.
8. A fluoroacetamide of the general formula

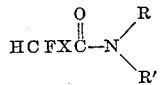

where X is a halogen atom, R is selected from the group consisting of hydrogen, alkyl and aryl groups, and R' is an alkyl group.
9. A process for the production of fluoroacetamides which comprises reacting a polyfluoroethylene containing at least three fluorine atoms and an organic amine containing amino-hydrogen and subsequently admixing water therewith.
10. A process for the production of fluoroacetamides which comprises reacting tetrafluoroethylene and an organic amine containing amino-hydrogen and subsequently admixing water therewith.
11. In a process for preparing a fluoroacetamide by reacting a polyfluoroethylene containing at least three fluorine atoms with an organic amine containing amino-hydrogen with admixture of water thereto, the step of reacting said polyfluoroethylene and said organic amine.
12. A fluoroacetamide having the general formula

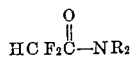

wherein the R substituents are alkyl groups.
13. N-di-n butyl difluoroacetamide.
14. A fluoroacetamide having the general formula

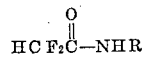

wherein R is an alkyl group.
15. N-n-butyl difluoroacetamide.
16. The process for obtaining fluoroacetamides which comprises heating tetrafluoroethylene with an alkylamine containing amino-hydrogen in the presence of water and a basic catalyst at a temperature within the range of from 50° C. to 200° C. under a pressure within the range of from one to 200 atmospheres.
17. The process for obtaining fluoroacetamides which comprises heating tetrafluoroethylene with an alkylamine containing amino-hydrogen in the presence of borax at a temperature within the range of from 50° C. to 200° C. under a pressure within the range of one to 200 atmospheres.
18. The process according to claim 17 wherein the alkylamine is a dialkylamine.
19. The process according to claim 17 wherein the alkylamine is di-n-butylamine.
20. The process according to claim 17 wherein the alkylamine is a monoalkylamine.
21. The process according to claim 17 wherein the alkylamine is n-butylamine.
22. N-n-butyl chlorofluoroacetamide.

GEORGE W. RIGBY.
HERMAN E. SCHROEDER.